United States Patent [19]
Gattrugeri

[11] 3,904,144
[45] Sept. 9, 1975

[54] EXPANSIBLE MANDREL

[76] Inventor: Giovanni Gattrugeri, Viale col di Lana 2, Milan, Italy, 20136

[22] Filed: July 3, 1972

[21] Appl. No.: 268,289

[30] Foreign Application Priority Data
July 2, 1971  Italy.................................. 26552/71
July 2, 1971  Italy.................................. 26553/71

[52] U.S. Cl............................... 242/72 B; 279/2 A
[51] Int. Cl.².................... B65H 75/24; B23B 31/40
[58] Field of Search............ 242/72 R, 72 B; 279/2;
82/44

[56] References Cited
UNITED STATES PATENTS
3,223,341  12/1965  Gadde............................. 242/72 B
3,414,210  12/1968  Gaudin........................... 242/72 B
3,493,189  2/1970  Seay................................ 242/72 B

*Primary Examiner*—Gil Weidenfeld
*Attorney, Agent, or Firm*—Guido Modiano; Albert Josif

[57] ABSTRACT

Expansible mandrel comprising a shaft having an axial hollow chamber. Pressing elements are guided in slots of the shaft. At least one hose member within said shaft is capable of being expanded by a fluid. Valve means control admission and exhaust of the fluid. Mounted in a conduit in said shaft is at least one check valve relative to each hose member. Engaging means project from the check valve. At least one slidable rod member is arranged for sliding movement in the shaft. The engaging means projects for engagement by the slidable rod member. Spring means are arranged between the rod member and a stationary portion of the shaft, to return the rod member to an inactive position.

5 Claims, 8 Drawing Figures

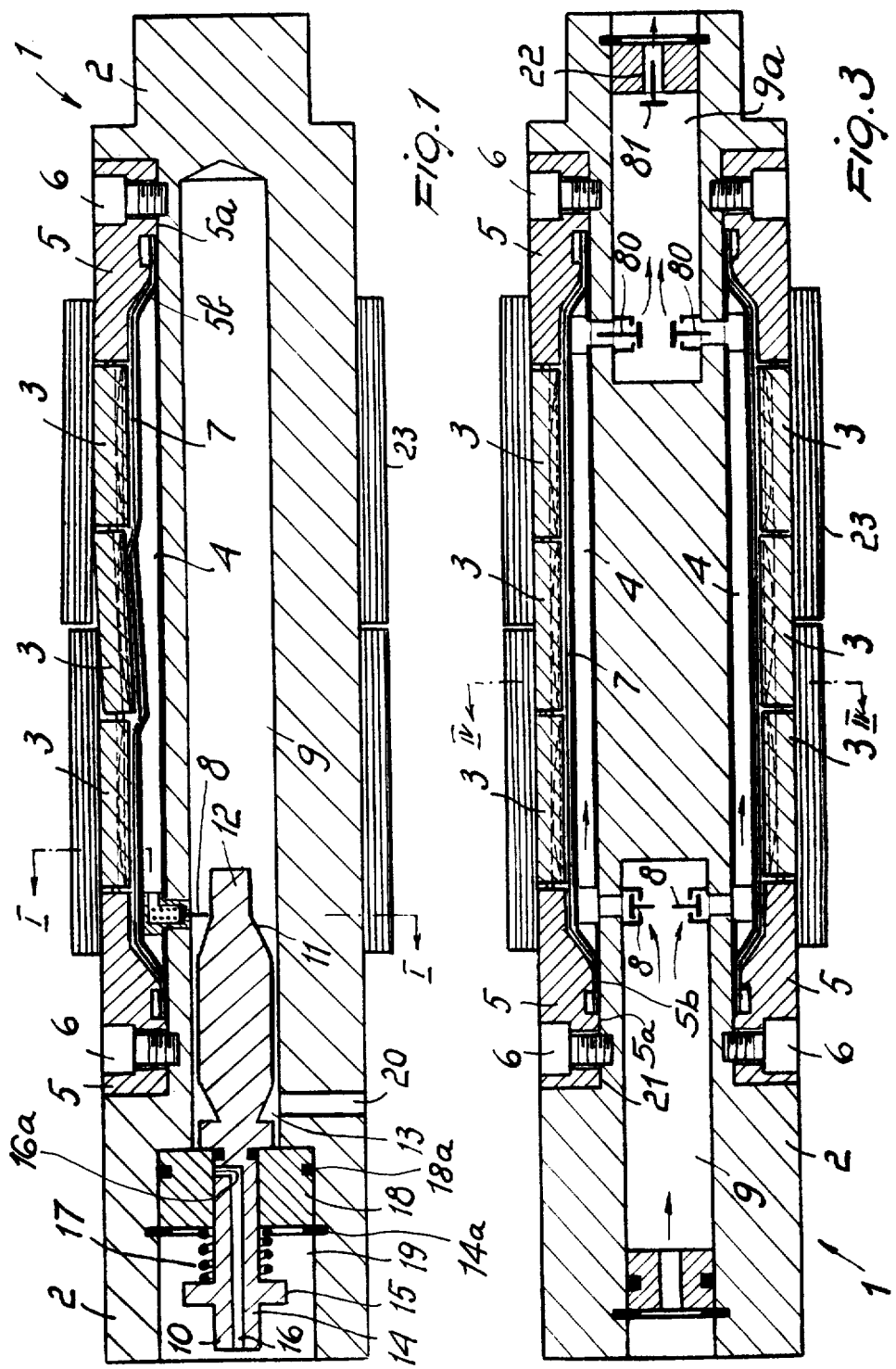

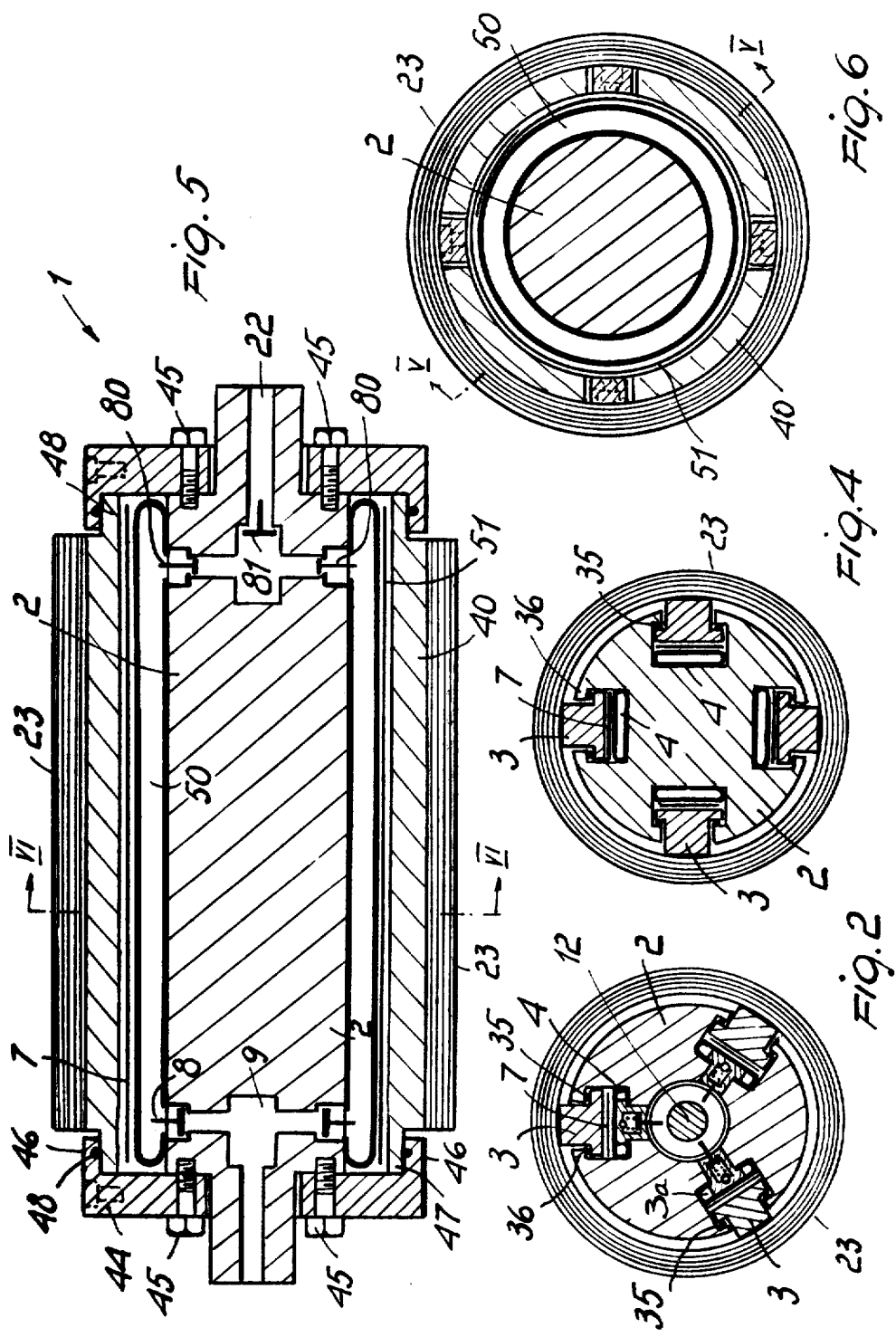

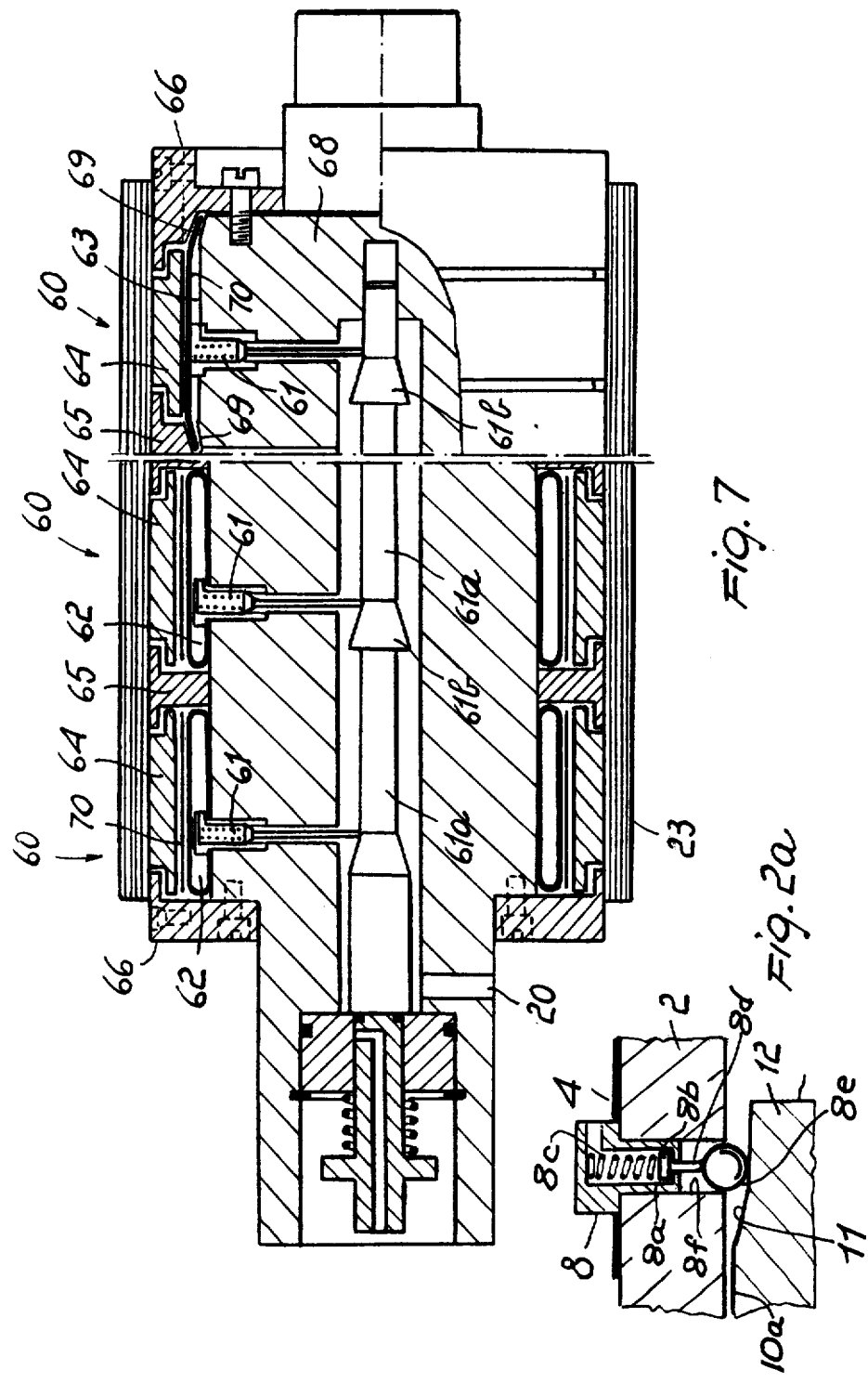

EXPANSIBLE MANDREL

BACKGROUND OF THE INVENTION

The present invention relates to a fluid controlled expansible mandrel, which is capable of gripping reels mounted thereon, which reels have to be subjected to winding and unwinding operations, said mandrel comprising a shaft, pressing elements mounted in said shaft and capable of movement in a radial direction under a pressure fluid control, at least one hose member inside said shaft, capable of being fed with a fluid under pressure actuating said control, and valve means to control admission and/or exhaust of said fluid, thus achieving the gripping or the loosening of said reels mounted on said mandrel.

Such expansible mandrels are well known in the art, and their main drawback resides in the fact that a leakage in any point of the hose members brings about a decompression of the fluid under pressure, with consequent loosening of the grip, which has understandable adverse effects on the material on said reels to be processed. Furthermore the control of said valve means appeared to be rather complicated.

SUMMARY OF THE INVENTION

It is an object of the present invention to eliminate such drawbacks, by providing a mandrel, in which a leakage in one or anyhow a limited number of points, while still undesirable, has no immediate adverse effects on the gripping, so that this leakage could be easily taken care of, after the stopping of the reels. It is a further object of this invention to provide a mandrel, in which the control of said valve means is easy to be performed.

These and other objects are reached by the mandrel according to the invention, which comprises a shaft, pressing elements mounted in said shaft and capable of movement in a radial direction under a pressure fluid control, at least one hose member inside said shaft, capable of being fed with a fluid under pressure to bring about said pressure fluid control, and valve means to control admission and/or exhaust of said fluid, wherein the improvement is characterized in that the mandrel comprises at least one check valve for each relative hose member, engaging means projecting from said check valve, at least one slidable member arranged to slide in said shaft along a path wherein said engaging means is projecting for engagement.

BRIEF DESCRIPTION OF THE DRAWINGS

Further features and advantages of the invention will appear from the description of some preferred embodiments, which refer to the enclosed drawing, wherein:

FIG. 1 is a longitudinal section of a mandrel according to a first embodiment, whereof FIG. 2 is a cross section according to line I—I of FIG. 1, and FIG. 2a is a detail at an enlarged scale, showing an automatic check valve;

FIG. 3 is a longitudinal section of a second embodiment of the inventive mandrel, whereof FIG. 4 is a cross section according to line IV—IV of FIG. 3, FIG. 5 shows a longitudinal section view of a third embodiment of the invention, whereof FIG. 6 is a cross sectional view according to line VI—VI of FIG. 5;

FIG. 7 shows a mandrel according to a fourth embodiment of the invention, in a longitudinal sectional view.

DESCRIPTION OF PREFERRED EMBODIMENTS

Referring now more particularly to the drawings, numeral 1 shows generally the expansible mandrel, of which a shaft portion is shown in 2. Referring now to FIGS. 1 to 4, in said shaft 2 pressure elements 3 having in cross section a T shape are movably mounted within peripheral longitudinal slots 3a, having a corresponding T-shape in cross-section. It is advantageous to divide, within each of said slots 3a, the elements 3 into segments, each of which is free to be radially moved so as to fit the surface irregularities of a reel to be gripped unto the mandrel.

Pressure elements 3 are caused to radially expand in a centrifuge direction by inflatable hoses or air tubes 4 (here termed hose members or hoses) arranged at the bottom of slots 3a and tightly secured at their two ends by shaped clamping pieces 5, which are urged against the shaft portion 2 by screws 6. According to a feature of the invention, clamping pieces comprise a rised portion 5a, preventing the hose ends to extend into the zone where the hole for the screw 6 is provided, thus avoiding the hose to be crossed by such screw moreover, in the absence of the rised portion 5a the tightening of the screw 6 would causes the rubber material to be squeezed until it is torn apart. A rib 5b has its upper surface at a level which is lower than the rised portion 5a, but which is high enough to secure a tight clamping of said end of the hose, when the screw 6 is tightened, without the danger of having it torn by an excessive tightening.

Between each hose 4 and the relative movable pressure elements 3, a protective metal sheet 7 is arranged. In the embodiment shown in FIGS. 1 and 2, three hoses are arranged in three slots. In this embodiment, an automatic valve 8 (FIG. 2a) is provided, which is of a construction which became conventional in automobile tires and accordingly comprises a body, having a passage 8a, wherein a valve member 8b is arranged to slide against the reaction of a spring 8c, said valve member 8b having a shaft 8d resting on a sphere or ball 8e, slightly extending outside a hole 8f in said shaft 2, in the path of a slidable rod 10, arranged within an axially hollow chamber 9 provided within the shaft 2. Said rod has a front portion 10a, which is cylindrical in shape, whereon said shaft 8d of the valve is made to rest through said sphere, a conical tapered portion 11 and a cylindrical main portion 12, wherein a circular slope 13 providing an inclined surface is slotted; a second portion 14, which is cylindrical in shape and has a diameter which is lower than the diameter of portion 12 provides a continuation of said rod, and has a collar 15, a conduit 16 being made to extend axially through said portion 14, which conduit 16 has a radial outlet 16a. Against collar 15, a helical spring 17 is made to rest, which spring reacts against a plug member 18, arranged in the hollow portion 19 at the end of the mandrel and across the axial hole of which said rod 10–14 is tightly slidable. Circular washers or gaskets 18a and 14a provide for the necessary air tightening of the axial hollow chamber of said shaft 2. A radial hole 20 in said shaft portion 2 opens within the zone of said slope 13, said hole being capable of connection with a not shown compressed air source. Between the lower inner walls of slots 3a (FIG. 2) and extensions 35 of such slots, sturdy spring means 36 are situated urging pressure elements 3 to re-enter slots 3a (thus compressing the hose members 4), as soon as the automatic check valve 8 is opened and air is discharged.

Since the gripping and the removal of a reel on a mandrel of the class described is well known in the art, only the inflating and discharging operation will now be described: When compressed air is admitted through hole 20 into the hollow portion 9, each single hose 4 is inflated through check valve 8. When pressure is discharged from the hollow portion 9, said hoses 4 are kept inflated by the nonreturn check valves 8. To discharge said pressure from said hoses, the rod 10 is caused to advance towards the inner part of the shaft 2, thus engaging with its tapered portion 11 the ball or sphere member 8e and lifting the valve 8b, whereby the compressed air may discharge. To cause the rod to advance, it is possible either to apply pressure to the collar 15 or to introduce, through hole 20, a screw-driver or the like, so as to press against the inclined slope 13: if by this step, hole 20 is partially or totally throttled, air may escape through conduit 16a, 16 to the outside, since hole 16a has been shifted to the right (with respect to FIG. 1) beyond the plug member 18.

It may now be easily appreciated that if one hose member suffers a leakage, this does not affect the other hoses 4, which may still assure at least temporarily a grip on the reel mounted on the mandrel; it is also readily appreciated that one single control movement of rod 10 brings about the discharge of all hoses, when desirable. The provision of usually spring steel sheets 7 has proven to be of an essential value in order to prolong the life of the hose members by avoiding them to be "pinched" between the segments forming the pressure elements and between such elements and the shaft 2.

Referring now more particularly to FIGS. 3 and 4, equal reference numerals show equivalent parts, while a description of some differences will make the embodiment more apparent. There are four peripheral longitudinal slots 3a in this embodiment.

A reel 23 is here shown mounted on the mandrel 1.

The discharge device comprises two automatic valves 8 and 80, which are associated each with a hose member 4, each near a respective end of said hose member, so as to respectively inflate and deflate the same. The first valve 8 is in communication with a hollow axial chamber 9 of shaft 2, whilst valve 80 is in communication with a second axial chamber 9a, which is not connected with chamber 9. Chamber 9a is in turn provided with a check valve 81 arranged on an axial discharge conduit 22, which valve 81 may be actuated through mechanical means which are obvious and are thus not illustrated.

The operation is as follows: When compressed air is admitted to chamber 9 all hose members 4 are simultaneously inflated in parallel through valves 8, which automatically close as soon as admission of air is ceased. From hoses 4, a part of the air exits through discharge valve 80 and raises the pressure in chamber 9a, thus closing the automatic check valve 81, which is aimed at controlling the decompression of the mandrel. In case of one hose member 4 showing a leakage, valves 80 avoid the other hose members to be deflated through the common chamber 9a or through the faulty hose member.

When decompression of all hose members and a consequent release of the grip of the mandrel are desired, it is enough to shift the rod of decompression valve 81, thus discharging chamber 9a and thereby all the hose members 4 connected in parallel through discharge conduit 22. If chambers 9 and 9a were in communication, the failure of just one hose member would entail passage of air towards the leaking spot and thus a decompression of all non affected hose members through their respective valves 80 into the common chamber, which decompression may so progress until the final deflation.

A third embodiment has been devised for those cases, in which a very expanded contact between the mandrel and the hollow hub of a reel or the like is desired. In such case, the pressure elements 3 are made of cylindrical members or cylindrical sectors. Referring to FIG. 5, four sectors 40 are provided, which encompass the external circumference of the mandrel. Two flanges 44 at the two ends of shaft 2 limit the radial stroke of sectors 40 by means of the extensions 46 cooperating with corresponding projections 47 of the sectors themselves and control the circumferential displacement with respect to the shaft through abutments, not shown in the drawing. Flanges 44 are secured to the shaft 2 by means of screws 45. Between the extensions 46 of flanges 44 and projections 47 of sectors 40, return springs 48 are positioned, which urge sectors 40 towards the shaft 2, thus releasing the grip when the relative hose members 50 are deflated. These hose members 50 are still tubular in shape, but have their end portions closed by a suitable welding or sticking. A hose member 50 may be made even by one single circumferential air tube, as is preferred, whilst in FIG. 5 two such hoses are shown; in FIG. 6 it has been assumed that only one single such circumferential hose 50 is provided (thus FIG. 6 is a cross section through a mandrel exactly as made in FIG. 5, except for the number of hoses 50).

The two hoses 50 are kept longitudinally separated by curved blade springs 52, secured to the shaft 2. The arrangement of the check valves and of the hoses, in order to inflate and deflate the same, is the same as the one shown in FIG. 3 and the working is thus the same. Between the hoses and the sectors, a single metal sheet 51 is arranged, which wraps the whole shaft and closes on itself by overlapping of the end portions thereof, so as to ensure expansion and spring action without ever disengaging the end portions: thus a convenient protection of the hoses 50 is performed.

Referring now to FIG. 7, the mandrel comprises a plurality of portions 60, adjacent to each other in a longitudinal direction. Each of said portions 60 comprises a hose extending along the whole circumference and provided with a relative check valve 61. In the embodiment shown in FIG. 7, three such hoses with three check valves 61 are provided, which are actuated by a single central rod 61a, having tapered portions 61b forming inclined surfaces (the elements which are similar to those of the other embodiments are designed by the same reference numerals).

According to one modification, toroidal hose members 62 are shown on the left hand side of FIG. 7, and another modification is shown on the right hand side of such drawing, according to which the hose is formed of a simple tubular element 63 of rubber or the like. Around the hoses 62 or 63, pressure elements 64 are arranged, capable of radial movement, which are kept in place and guided by intermediary flange members 65 and by end flanges 66 and 67.

If the hoses are made of rubber tubular elements 63, the shaft 68 on which they are mounted will be provided with conical portions 69, at the end of said rubber elements 63, and accordingly, the intermediary flanges 55 and end flanges (as those shown in 57) will have inner surfaces which are conical in shape, so that after tightening of for instance a screw member 70, said conical portions will compress the end of the tubular elements 63, whereby the space between the tubular elements and the shaft 68 is air proof. When compressed air is supplied through the hole 20 and the check valves 61, an expansion of said tubular elements occurs. As a consequence, the flexible steel blades 71 are spread out, such blades 71 being arranged between tubular elements or hoses 53 and pressure elements 64, thereby expanding the later. The discharge occurs by displacing the rod 61a, so as to simultaneously actuate the valves 61 through the inclined surfaces 61b.

The invention so conceived is susceptible to numerous modifications all of which fall within the scope of the inventive idea.

I claim:

1. An expansible mandrel comprising a shaft, a first axial hollow chamber in said shaft, said chamber selectively communicating with a source of fluid under pressure, at least two longitudinal slots on the periphery of said shaft and being circumferentially spaced apart, pressing elements received in said slots, said slots and said pressing elements having cooperating means to guide said pressing elements radially with respect to the shaft, an inflatable air hose member received in each of said slots, said air hose members being located beneath said pressing elements and being supported on said shaft and closed at the ends thereof to allow said air hose members to be inflatable for urging said pressing elements radially outward, each hose having passage means providing pneumatic communication between the interior of the hose member and said first chamber, wherein the improvement comprises each hose having valve means controlling the admission of fluid from said first chamber through said first passage means into the interior of said hose member for inflation thereof and for controlling the exhaust from said air hose member interior into said chamber for deflation thereof the valve means of each hose member being independent of the pressure condition of any other hose member.

2. An expansible mandrel according to claim 1, wherein said valve means are of the check valve type closing the passage of fluid therethrough when the pressure within the hose is greater than the pressure within said first chamber and opening the passage therethrough when the pressure conditions are reversed.

3. An expansible mandrel according to claim 1, further comprising a second hollow chamber at a distance from said first hollow chamber and pneumatically secluded therefrom, second passage means providing pneumatic communication between said second chamber and said hose members at a distance from said first passage means, each of said hoses having a second check valve opening allowing the passage of fluid therethrough when the pressure within the hose is greater than the pressure within said second chamber and closing the passage of fluid therethrough when the pressure conditions are reversed, a discharge opening in said second chamber and a valve controlling the flow of fluid through said discharge opening.

4. An expansible mandrel as claimed in claim 1 wherein said slots in said shaft have a T-shaped form, and said pressing elements in said slots have a corresponding T-shaped form.

5. An expansible mandrel as claimed in claim 1, wherein said hose members comprise a protective metal sheet arranged between the outer portion of said hose members and said pressing elements.

* * * * *